UNITED STATES PATENT OFFICE.

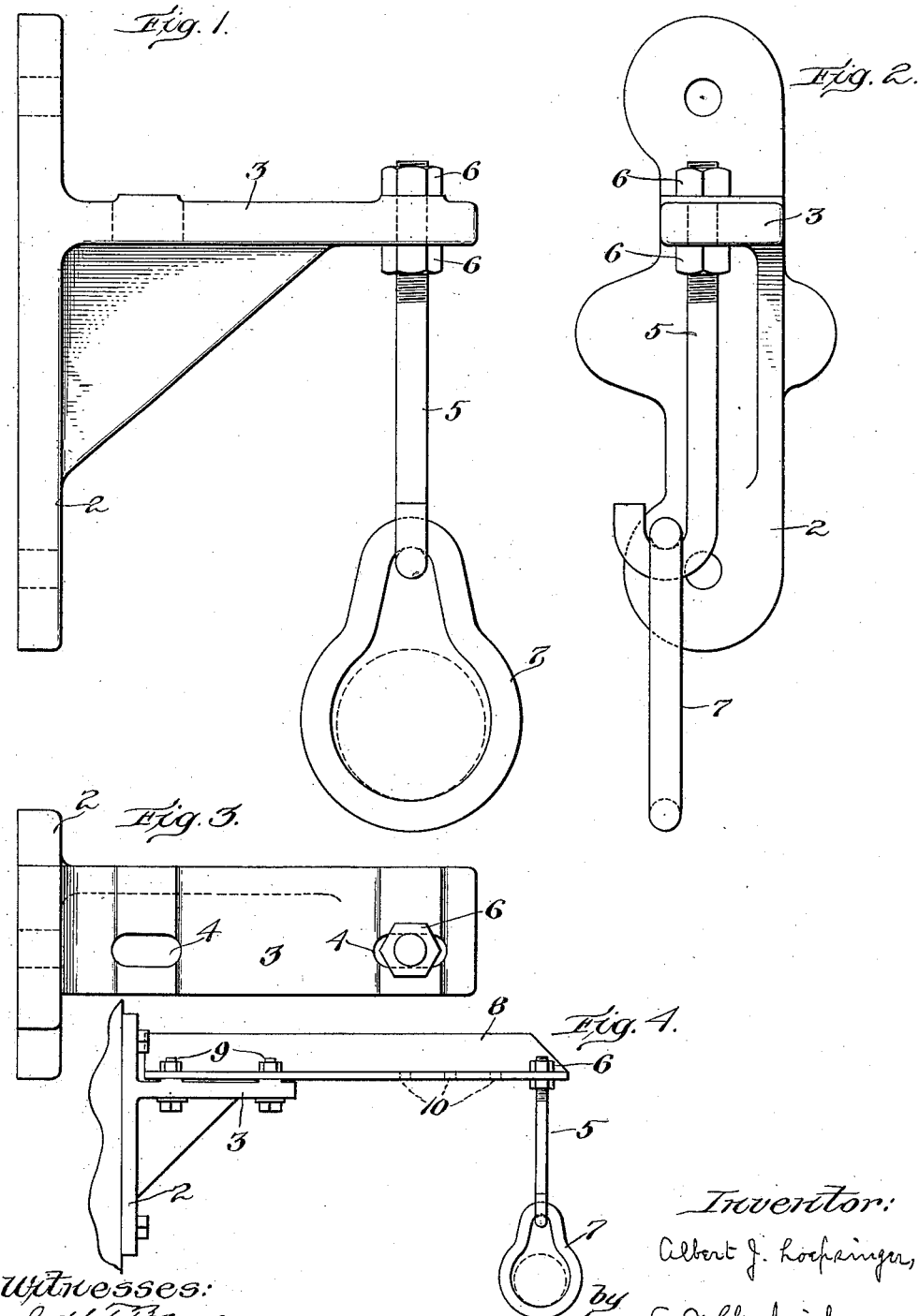

ALBERT JOHN LOEPSINGER, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

PIPE-HANGER.

1,077,727.     Specification of Letters Patent.     Patented Nov. 4, 1913.

Application filed August 28, 1911. Serial No. 646,419.

*To all whom it may concern:*

Be it known that I, ALBERT J. LOEPSINGER, a citizen of the United States, residing at Providence, in the county of Providence and State of Rhode Island, have invented new and useful Improvements in Pipe-Hangers, of which the following is a specification.

In equipping buildings with automatic sprinkler pipes it is sometimes necessary to suspend the pipes from hangers carried by vertical walls in such situations that considerable variations in the distance of the pipes from the walls have to be provided for, and my present invention is intended to provide a simple form of pipe hanger for use in such locations which will enable a given pipe to be supported at any desired distance from a wall, within practical limits, without making it necessary to provide a variety of supporting brackets of different sizes, the features of construction and arrangement whereby this result is secured being hereinafter set forth.

My hanger as preferably constructed is illustrated in the accompanying drawings, in which:

Figure 1 is a side elevation of the bracket portion of the hanger, with a pipe-suspending device supported thereby; Fig. 2 is a front elevation of the parts shown in Fig. 1; Fig. 3 is a plan view of the same parts; and Fig. 4 is a side elevation of the bracket provided with an extension support hereinafter described.

Referring first to Figs. 1, 2 and 3 of the drawings, 2 indicates a bracket adapted to be bolted to the face of a vertical wall and having an outwardly-extending arm 3 which is provided with vertical perforations 4, said perforations being elongated in the direction of the length of the arm 3 as shown in Fig. 3. 5 represents a hook having a threaded shank which is adapted to be passed through one of the perforations 4 and secured therein by means of nuts 6. The hook 5 carries a pipe suspending device of any desired form, such as a loop 7 through which the pipe is passed, as indicated in dotted lines in Fig. 1.

The parts above described enable a pipe to be suspended in various positions adjacent to the wall, vertical adjustments being provided for by the threaded shank of the hook 5 with its nuts 6 and small adjustments in the distance of the pipe from the wall being provided for by the elongated perforations 4, within which the shank of the hook 5 may be shifted toward or away from the wall, but when it is desired to suspend the pipe at a greater distance from the wall than can be done by the use of the bracket 2 alone, an extension 8, Fig. 4, is secured at one end to the top of the arm 3 by means of bolts 9 passing through the perforations 4 and having nuts thereon, said extension being preferably made of angle iron and being provided at its outer portion with one or more perforations 10 passing vertically through its horizontal flange and adapted to receive the shank of the hook 5, with the pipe-suspending device thereon. This arrangement makes it possible to locate the pipe at any desired distance from the wall without necessitating the employment of supporting brackets of various sizes, and small lateral adjustments in the position of the pipe when the extension 8 is employed are also provided for by the elongated perforations 4, as already described, since the bolts 9 which secure the extension 8 to the arm 3 can be moved toward and away from the wall within these perforations.

A simple, strong and durable pipe hanger is thus provided which will serve efficiently for supporting a pipe in any desired position and will permit the same to be adjusted both vertically and horizontally, and since the bracket 2 and the extension 8 are separable the complete hanger is much more readily packed and transported than a one-piece hanger would be if made large enough to support a pipe at the maximum distance from the wall, while in case the pipe is to be supported relatively near the wall the extension 8 may be omitted entirely. A number of such extensions of different lengths may be provided for use with a single size of supporting bracket, if desired, and it will be evident that several pipes may be suspended from a single extension if occasion requires.

I claim as my invention:

A pipe hanger comprising a bracket adapted to be secured to a vertical wall and having an outwardly-extending arm provided with vertical perforations which are elongated in the direction of the length of the arm, a pipe-suspending device having a threaded shank adapted to be passed through either of said elongated perforations and adjusted therein lengthwise of the arm, a nut on said shank for adjusting it vertically, and an extension adapted to be detachably secured at its inner portion to said outwardly-extending arm by means of bolts passing through the elongated perforations therein, whereby said extension is capable of adjustment lengthwise of said arm, said extension having in its outer portion one or more vertical perforations each adapted to receive the threaded shank of the pipe-suspending device.

In testimony whereof, I have hereunto subscribed my name this 19th day of August, 1911.

ALBERT JOHN LOEPSINGER.

Witnesses:
 LEONARD STANLEY TABER,
 JOSEPH FRANCES CONLEY.

Copies of this patent may be obtained for five cents each, by addressing the "Commissioner of Patents, Washington, D. C."